US007120272B2

(12) United States Patent
Guiguizian

(10) Patent No.: US 7,120,272 B2
(45) Date of Patent: Oct. 10, 2006

(54) MEDIA DETECTING METHOD AND SYSTEM FOR AN IMAGING APPARATUS

(75) Inventor: Paul J. Guiguizian, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 937 days.

(21) Appl. No.: 10/144,487

(22) Filed: May 13, 2002

(65) Prior Publication Data

US 2003/0210434 A1 Nov. 13, 2003

(51) Int. Cl.
*G06K 9/00* (2006.01)

(52) U.S. Cl. ........................................ 382/100; 358/474

(58) Field of Classification Search ................ 382/100, 382/212, 145, 147; 358/1.1, 1.9, 1.12, 1.15, 358/473, 474, 408, 486, 489, 491, 493, 494, 358/496, 497, 505, 506; 355/40, 41; 400/207, 400/208; 430/347, 385, 538, 543, 496, 536; 347/16, 19, 37, 129, 225, 233, 235, 250
See application file for complete search history.

(56) References Cited

U.S. PATENT DOCUMENTS

| | | | |
|---|---|---|---|
| 3,697,759 A | | 10/1972 | De Cock |
| 4,158,234 A | | 6/1979 | Grandchamp |
| 4,403,184 A | | 9/1983 | Witt et al. |
| 4,617,580 A | | 10/1986 | Miyakawa |
| 4,745,633 A | | 5/1988 | Waksman et al. |
| 4,869,532 A | | 9/1989 | Abe et al. |
| 4,920,374 A | | 4/1990 | Yamamoto |
| 5,146,087 A | | 9/1992 | Van Dusen |
| 5,225,900 A | | 7/1993 | Wright |
| 5,258,789 A | | 11/1993 | Labaziewicz |
| 5,293,430 A | | 3/1994 | Shiau et al. |
| 5,319,401 A | | 6/1994 | Hicks |
| 5,342,671 A | | 8/1994 | Stephenson |
| 5,404,320 A | | 4/1995 | Butler |
| 5,489,767 A | | 2/1996 | Billington |
| 5,774,146 A | * | 6/1998 | Mizutani ..................... 347/43 |
| 5,925,889 A | | 7/1999 | Guillory et al. |
| 5,984,193 A | | 11/1999 | Uhling |
| 5,995,197 A | | 11/1999 | Yoshino |
| 6,028,320 A | | 2/2000 | Uhling |
| 6,030,742 A | * | 2/2000 | Bourdelais et al. ......... 430/201 |
| 6,079,807 A | * | 6/2000 | Lindstrom et al. ............ 347/16 |
| 6,097,497 A | | 8/2000 | McGraw |

(Continued)

FOREIGN PATENT DOCUMENTS

| | | |
|---|---|---|
| EP | 0 521 662 | 9/1998 |

*Primary Examiner*—Jingge Wu
*Assistant Examiner*—Abolfazl Tabatabai
(74) *Attorney, Agent, or Firm*—David A. Novais; Kathleen Neuner-Manne

(57) ABSTRACT

A system and method of detecting a type of media for an imaging apparatus. In the system and method of the present invention, a backside of the media is scanned or read to detect the presence of indicia on the backside of the media. The spacing between the repeated indicia on the media is measured for the purpose of detecting the type of media. That is, the system of the present invention includes a sensor that makes sequential spatial measurements of a moving media that contains repeated indicia to determine a repeat frequency and repeat distance of the indicia. The repeat distance is then compared against known values to determine the type of media present.

14 Claims, 2 Drawing Sheets

U.S. PATENT DOCUMENTS

| | | | | |
|---|---|---|---|---|
| 6,099,178 | A | 8/2000 | Spurr et al. | |
| 6,106,166 | A | 8/2000 | Spurr et al. | |
| 6,127,106 | A * | 10/2000 | Haydock et al. | 430/536 |
| 6,133,984 | A | 10/2000 | Deguchi et al. | |
| 6,192,141 | B1 | 2/2001 | Ahn | |
| 6,203,069 | B1 | 3/2001 | Outwater et al. | |
| 6,222,607 | B1 | 4/2001 | Szajewski et al. | |
| 6,297,873 | B1 | 10/2001 | Furuya | |
| 6,585,341 | B1 * | 7/2003 | Walker et al. | 347/14 |
| 6,775,034 | B1 * | 8/2004 | Morford | 358/473 |

* cited by examiner

MEDIA DETECTING METHOD AND SYSTEM FOR AN IMAGING APPARATUS

FIELD OF THE INVENTION

The present invention relates to the concept of detecting the type of media that is to be utilized in an imaging apparatus such as a printer or a scanner. More specifically, the present invention relates to the concept of identifying media type based on the detection of a repeating indicia on the back of the media. The invention is applicable to media such as photographic paper, thermal paper or ink jet paper.

BACKGROUND OF THE INVENTION

In the processing of media in, for example, a printer or scanner, knowledge of the type of media being processed is beneficial, to optimize the use of the media and to assure that the processing that is performed on the media is consistent with the specific type of media in the processor.

There are many methods of detecting media type. Some of these methods require additional manufacturing steps, such as applying a special mark, a barcode or a notch on the media. This adds to the cost of manufacturing the media and also creates unsightly markings on the media.

During the manufacture of media, logos or other indicia are often printed on the backside in a repeating pattern due to the web printing manufacturing methodology. If the indicia spacings are unique for each type of product, then the spacing of the indicia can differentiate product type.

SUMMARY OF THE INVENTION

The present invention provides for a system and apparatus for identifying a type of media used in an imaging apparatus such as a printer or a scanner.

With the system and method of the present invention, indicia that is provided on the backside of the media during the manufacture of the media is used to identify the type of media. That is, since the indicia spacing can be unique for each type of media, the spacing of the indicia can differentiate product types. As indicated above, the indicia could be a product logo, a product name or other types of repeating markings or patterns provided on backside of the media during the manufacture of the media. The system and method of the present invention provides for a low cost method of identifying a media type since it is based upon an existing or added repeated pattern, such as a logo printed on the backside of a photographic paper. Further with the system and method of the present invention, there are no additional steps that would be required in the manufacture of the media, and extraneous matters such as barcode or notches would not have to be placed on the media.

Accordingly, the present invention provides for a method of detecting a type of media for use in an imaging apparatus. The method comprises the steps of reading a backside of the media to detect the presence of indicia on the backside of the media; measuring a frequency of repetition of the detected indicia along a lengthwise direction of the media; determining a spatial distance between the detected repeating indicia on the backside of the media; and comparing the spatial distance against stored predetermined spatial distances of indicia on reference media to determine the type of media.

The present invention further relates to a method of detecting a type of media for use in an imaging apparatus which comprises the steps of directing a beam of infrared illumination onto a backside of media having repeating indicia thereon; detecting the infrared illumination reflected from the backside of the media to provide for a first signal; detecting a change in the reflected infrared illumination when the repeating indicia receives the beam of infrared illumination to provide for a second signal; calculating a repeat distance of the indicia based on the first and second signals, and comparing the calculated repeat distance to stored indicia repeat distances for reference media to determine the type of media.

The present invention further relates to an imaging apparatus that comprises a media path for the passage of media therethrough; a light source for directing a beam of light onto a backside surface of media in the media path; a sensor positioned to receive light from the light source which reflects from the media in the media path, with the sensor being adapted to provide a first signal when the light is reflected from the backside surface of the media and a second signal responsive to a change in an amount of the reflected light when a repeating indicia on the backside surface of the media receives the beam of light; and a controller adapted to calculate an indicia repeat distance based on the first and second signals and compare the calculated repeat distance to stored indicia repeat distances for reference media to determine the type of media.

DETAILED DESCRIPTION OF THE INVENTION

Figure 1:
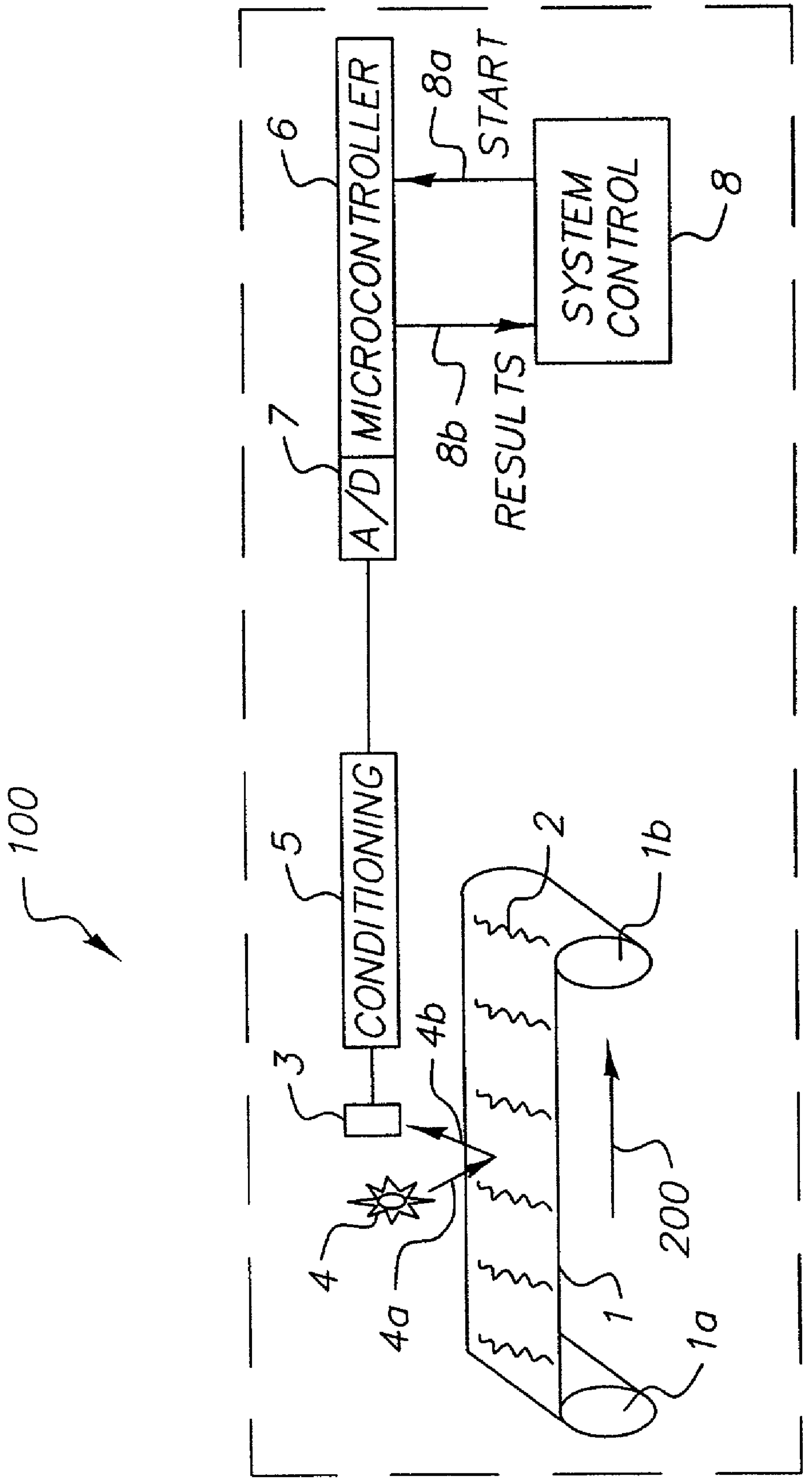
FIG. 1 schematically illustrates an imaging apparatus or at least a portion of the imaging apparatus which details the media path and system of the present invention for detecting a type of media.

With reference to the drawings, wherein like reference numerals represent identical or corresponding parts throughout the several views, FIG. 1 schematically illustrates an imaging apparatus 100 or at least a portion of an imaging apparatus in which the elements pertinent to the present invention are shown. It is recognized that imaging apparatus 100 can be a known printer or scanner which includes a conveying path for the passage of media or paper therethrough, a printing or exposure station and optionally supply and take-up cassettes or trays. Those elements which are pertinent to understanding the present invention are shown in FIG. 1. The present invention is also applicable to dye sublimation/thermal dye transfer printers.

Imaging apparatus 100 as illustrated in FIG. 1 includes a supply roll 1*a* for media 1, as well as a take-up roll 1*b*. Media 1 preferably passes along a media path represented by arrow 200 through a plurality of stations of imaging apparatus 100 such as, for example, an exposure station, a printing station, a cutting station, etc. In the example of FIG. 1, a media type detecting system in accordance with the present invention is shown relative to media path 200.

More specifically, as shown in FIG. 1, in the system and method of the present invention web of media 1 such as photographic paper, has a printed detectable repeating logo pattern or indicia 2 on the backside. Media 1 can pass under a photo sensor 3 or optionally, photo sensor 3 can pass over stationery media 1. An infrared (IR) source 4 directs an IR beam 4*a* onto the surface or backside of media 1, while photo sensor 3 detects IR illumination 4*b* reflected off the surface of media 4. The presence of an IR absorbing logo such as indicia 2, or a reflectivity difference in the media, changes the amount of reflected IR illumination and therefore changes the signal produced by sensor 3. In the embodiment of FIG. 1, media 1 is a web of photographic paper or continuously fed media, however, any media, such as cut sheets with visible or non-visible detectable repeating indicia can be used.

Within the context of the present invention, IR illumination is used so that no damage will occur to visible light sensitive photographic paper. However, other forms of detection are possible, such as the use of visible or non-visible illumination, magnetic inks and other physical characteristics such as thickness variations as long as it is detectable and repeats at a known distance or rate.

As shown in FIG. 1, the signal from sensor 3 is passed through conditioning electronics 5, such as amplifiers or filters, to improve the sensor signals and prepare it for conversion to digital form by an analog to digital converter 7 or digitizer by way of a micro-controller or computer 6. The digital data is thereafter placed into a buffer for processing by a Digital Signal Processor (DSP) or other computer of appropriate processing capacity such as micro-controller or computer 6. System operation begins with a start signal 8*a* from a host or a system computer 8 to micro-controller 6. Thereafter, a result signal 8*b* from micro-controller 6 is passed to system or host computer 8.

In one example of operation of the present invention, media 1 with repeating indicia 2 passes under sensor 3. When beam 4*a* of infrared illumination from infrared source 4 is reflected off a portion of the backside of media 1 which does not include repeating indicia 2, a reflected illumination 4*a* of a first value or intensity is provided to sensor 3. Sensor 3 then provides a first signal representative of this first value or intensity to conditioning electronics 5. When beam 4*a* of light from infrared source 4 is directed onto repeating indicia 2, the intensity of reflective illumination 4*b* will change as a result of the IR illumination being absorbed by indicia 2. This results in a reflected illumination 4*b* of a second value or intensity which is provided to sensor 3. Sensor 3 then provides a second signal representative of this second value or intensity to conditioning electronics 5. The repeated exchange between the first and second signals as a moving web with repeating indicia passes by sensor 3, provides for an intensity profile which is reflective of the spacing between repeating indicia on the backside of the media.

In the present invention, a lookup table which includes a plurality of reference indicia spacings representative of reference media can be provided in host computer 8. More specifically, a lookup table can include the repeating indicia spacing of known or reference media. The calculated repeating indicia spacing created by the passage of media or web 1 can thereby be compared to the reference spacings to determine the type of media.

Figure 2:
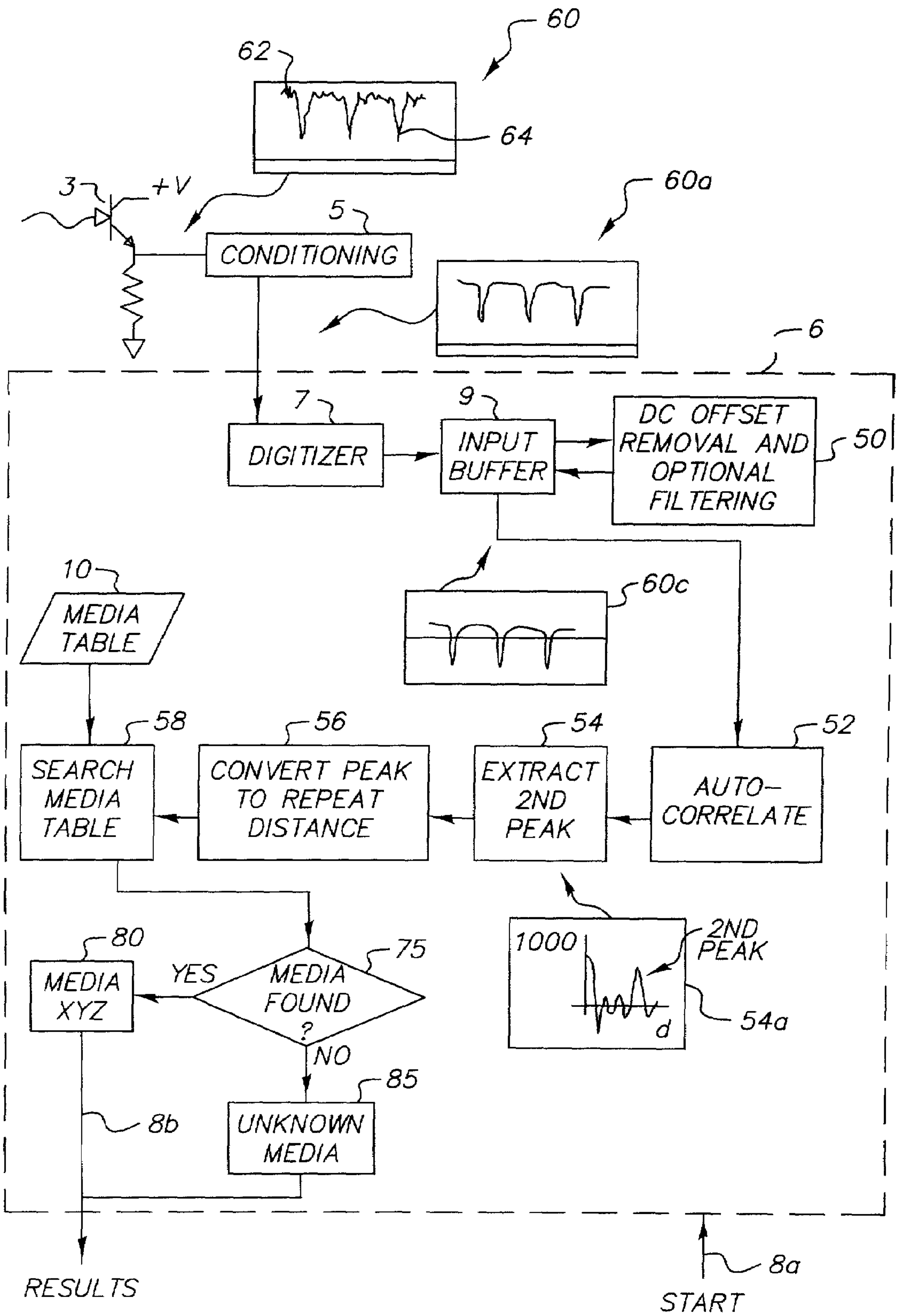
FIG. 2 is a detailed view of the control system of FIG. 1.

With reference to the specifics of the controller 6, reference is made to FIG. 2 of the present application which illustrates the data flow in the present invention. In FIG. 2, the dotted box schematically represents controller 6.

In the present embodiment, controller 6 can be a Texas Instrument MSP430F149 controller with an on-chip 12-bit digitizer 7, 2 K bytes of RAM 9 for the data buffer, and 60 K bytes of flash memory for program storage, and a fast hardware multiplier. The benefit of controller 6 as shown is that it provides for a low-cost and fast hardware multiplier. Many other controllers, DSPs or computers could be utilized within the context of present invention.

With respect to an operation of the system and method of the present invention, controller 6 essentially waits in a loop for start signal 8*a* from host computer 8. Start signal 8*a* is a digital input to controller 6 that causes an interrupt. The interrupt handler starts the onboard 12 bit analog-to-digital converter 7. The conversion rate is dependent on the media velocity, the size of the indicia and the desired resolution of the repeat distance value. Within the context of the present invention, an auto-correlation is utilized for identifying the repeat signals. Auto-correlation is a well known technique for identifying repeat signals buried within noise and other random signals. In the present invention, it is preferable to have at least two repeat distances worth of data for the auto-correlation to work. More repeats will reduce the amount of noise in the auto-correlation results and will produce better results.

The amount of data, the media resolution of the digitization and the rate of data sampling are all dependent on web speed or sensor speed for a fixed media and a variable sensor, the indicia spacing and the desired indicia spacing resolution. For example, if the indicia repeat is 3 inches and the desired resolution of the indicia spacing measurement 0.1 inches, then at least 20 samples per inch (0.05 inches/sample) must be attained over a distance of at least 6 inches.

In this embodiment, a logo repeat distance of 4.25 inches is expected and a sample every 0.5 mm was chosen. Controller 6 has enough RAM memory 9 to store 1024 12-bit signed data points. Some RAM must be left available for scratch memory and stack space, so that, for example, 900 data points would be acceptable to acquire. This allows 450 mm., or about 17.7 inches of media to be sampled. The 17.7 inches allows slightly over 4 repeats of the expected 4.25 inch repeat media and would also allow media with repeats of up to slightly over 8 inches to be measured. The sample rate is dependent on the media velocity (or the velocity of the sensor for fixed media and a movable sensor). In the example, the sample rate is fixed at 37 inches per second. Acquisition of 900 data points at 0.5 mm per sample and 37 inches per second will take 0.48 seconds. In other embodiments, a signal from the host computer can be used to determine the media velocity. The velocity should be constant during the acquisition of the data.

The analog signal from the sensor may require some conditioning prior to digitization. Signal conditioning may include amplification, filtering or voltage leveling to meet the needs of digitizer 7, to reduce noise, or to convert the sensor signal to a voltage or to provide application. In the present embodiment, sensor 3 is preferably an off the shelf reflection sensor. The sensor may contain an 880 nm IR LED for illumination and a phototransistor sensitive to that wavelength. The IR illumination is angled so that any absorption at that wavelength, or any change in surface reflectivity, will show up as a change in phototransistor response of sensor 3. Examples of changing surface reflectivity on media involves, but is not limited to, having an embossed backside logo with or without an IR dye, having a patterned IR dye, or in the case of photographic paper, modifying the surface of the resin coat. Of course, these are just examples and other methods of changing surface reflectivity are applicable within the context of the present invention. The phototransistor signal is converted to a voltage using a simple resistor. IR illumination was chosen due to light sensitive photographic paper as previously noted.

After controller 6 has acquired 900 data points, the data can be filtered again, and should have its DC offset removed (step 50) in FIG. 2 so that the average of the signal is zero. Zero mean is a requirement of the auto-correlation algorithm. In the present embodiment, the signal is filtered by controller 6 using a simple moving average. Therefore, after filtering, the next step is to remove the dc component of the data (step 50). The mean value of the data is computed and then subtracted from each point. The data values are stored as signed integers.

Auto-correlation (step 52) is then computed in two steps. The auto-correlation algorithm is shown here:

$$A_d = \frac{1}{C}\sum_{i=0}^{N-d-1} V_i \times V_{i+d}$$

where

N is the number of data points in the buffer;

V is the input data with mean of zero;

A is the normalized auto correlation results;

d is the delay; and

C is used to normalize the auto-correlation output to 1000, where:

$$C = \frac{1}{1000}\sum_{i=0}^{N-1} V_i \times V_i$$

The first step in this computation is to determine the zero delay output, or the value of C. This value is always the maximum and is used to normalize the output data to have a peak of 1000 at the zero location. The results A(d) is a measure of how well the data correlates with itself at a delay of d points. The output for each delay value is computed. This operation is multiplication intensive, hence the desire to have the multiplication performed in hardware on controller 6. The delay value can be converted to a physical distance on the media using this formula. Distance=0.5 mm*d where 0.5 mm is the spatial sample interval on the media. The auto-correlation values only need to be computed for a maximum delay of half the number of data points. This is because at least two repeat cycles of indicia are preferably needed.

The second highest peak in the auto-correlation output is then found (step 54). The highest peak is at the zero location so we must make sure we are not near the highest peak when looking for the second highest peak. The easiest way to accomplish this is to assume a minimum repeat distance and start the search there. For this embodiment the peak search starts at a repeat of 30 mm, or a delay of 60 points. It is assumed that no repeating indicia will have a repeat distance of less than 30 mm. This value is somewhat arbitrary. The output of the auto-correlation data is not stored. To save memory, only the height and location of the second highest peak is saved. The height of the second peak (see reference numeral 54*a*) is an indication of how well the indicia correlate with each other. Low peak value would be an indication of low correlation most likely due to a low or noisy input signal. It is also possible to not normalize the auto-correlation output to retain an indication of signal strength rather than perform a separate peak-to-peak measurement of the input signal.

The peak location and peak value is then used to search a media table 10 (step 58). Table 10 is a stored list of known repeat distances for reference media, minimum peak height, and product type. The peak-to-peak input signal may also be used to compare against an expected value in the look up table to help identify the media.

The indicia repeat distance is then compared to media table 10 of known repeat indicia distances to determine what media is present. As a result of searching media table 10, it is determined if the measured information (i.e. repeat distance) or the media matches the stored information in media table 10. That is, as a result of searching media table 10, it is determined if the type of media has been found or identified (step 75). If yes, the identified type of media (step 80) is provided to host computer 8 via signal 8*a*. If the media is not identified as a result of the search in media table 10, a signal representative of the fact that the media is unknown (step 85) can be provided to host computer 8 via signal 8*b*. Lookup table 10 can be embedded in micro-controller 6, or host or system computer (8). The expected repeat distances are actually a range of values to account for variability in the indicia laydown and measurement error.

For this embodiment, the output signal is simply a single digital line that indicates whether one of the media in the table is present. Many other methods of signaling are possible such as over a serial line, multiple digital lines, parallel, etc. The name of the media could be sent, or properties of the detected media such as the repeat distance measured, the maximum signal measured, variability in the signal, etc.

In a preferred embodiment of the present invention, it is noted that the physical property being measured should be detectable by the sensor. Second, the distance between the indicia should be constant. Third, the sensor should detect the same part of the indicia as each indicia passes under the sensor, otherwise the indicia signals will not correlate well with each other.

In FIG. 2, an intensity profile 60 as a result of reading or scanning a backside of media with indicia thereon by sensor 3 is shown. Intensity profile 60 describes a profile of intensity versus location on the media. High points 62 of the graph basically represents the white point or the background of the media, while low points 64 represent the presence of indicia or more specifically, the indicia being read by sensor 3. The lower the point 64, the darker the indicia on the backside of the media is. Essentially, when there is no indicia being read by sensor 3, (i.e. sensor 3 is scanning the backside surface of the media which has no indicia), a first signal is provided by sensor 3. When sensor 3 detects the presence of indicia, sensor 3 provides for a second signal.

Intensity profile 60 is thereafter passed through conditioning electronics 5 as previously described which can be amplifiers or filters to improve the sensor's signals and provide for an intensity profile 60*a*. After passing through input buffer 9 and DC offset removal 50, the intensity profile takes the form of profile 60*c* prior to auto-correlation 52.

Therefore, the present invention provides for a system and method for detecting a type of media so as to optimize the use of the media in an imaging apparatus such as a printer or scanner. Sensor 3 is preferably placed prior to an exposure or printing station of a media apparatus. In the present invention, the backside of media is either scanned or read to detect the presence or non-presence of indicia along a lengthwise direction of the backside of the media. As a result of the scanning or reading of the backside of the media, a frequency of repetition of detected indicia along the lengthwise direction of the media can be measured. This frequency of repetition of the detected indicia can be used to create a profile such as an intensity profile or indicia profile which is representative of the repetition of the indicia of the backside of the media. This profile can then be compared to stored profiles or values of reference media in a lookup table to determine the type of media that is being detected. Based on the knowledge of the type of media, the imaging apparatus can then be appropriately controlled to be consistent with the requirements of the detected media.

The system of the present invention measures the spacing of repeating indicia on media and uses this value to detect and determine the type of media. Sensor 3 makes spatially sequential measurements of media that contains the repeating indicia. The measurements can be digitized and stored in a buffer. Once the buffer is full, auto-correlation of the data is used to detect the repeat frequency. This frequency is converted into a spatial repeat distance based on the sampling interval of the digitizer and the velocity of the moving media or moving sensor. The repeat distance is then compared against known values to determine the type of media present.

The invention has been described in detail with particular reference to certain preferred embodiments thereof, but it will be understood that variations and modifications can be effected within the spirit and scope of the invention.

What is claimed is:

1. A method of detecting a type of media for use in an imaging apparatus, the method comprising the steps of:

reading a backside of the media to detect a presence of indicia on the backside of the media;

measuring a frequency of repetition of the detected indicia along a lengthwise direction of the media;

determining a spatial distance between the detected repeating indicia on the backside of the media; and comparing said spatial distance against stored predetermined spatial distances of indicia on reference media to determine the type of media.

2. A method according to claim 1, wherein said indicia comprises a backside logo on the media.

3. A method according to claim 1, wherein said media is in the form of a web or cut sheets.

4. A method according to claim 1, wherein said media is photographic paper.

5. A method of detecting a type of media for use in an imaging apparatus, the method comprising the steps of:

directing a beam of infrared illumination onto a backside of a media having repeating indicia thereon;

detecting the infrared illumination reflected from the backside of the media to provide for a first signal;

detecting a change in the reflected infrared illumination when the repeating indicia receives said beam of infrared illumination to provide for a second signal;

calculating a repeat distance of said indicia based on said first and second signals; and comparing said calculated repeat distance to stored indicia repeat distances for reference media to determine the type of media.

6. A method according to claim 5, wherein said indicia comprises a backside logo on the media.

7. A method according to claim 5, wherein said media is in the form of a web or cut sheets.

8. A method according to claim 5, wherein said media is photographic paper.

9. An imaging apparatus comprising:

a media path for a passage of media therethrough;

a light source for directing a beam of light onto a backside surface of media in the media path;

a sensor positioned to receive light from the light source which reflects from the media in the media path, said sensor being adapted to provide a first signal when the light is reflected from the backside surface of the media and a second signal responsive to a change in an amount of the reflected light when a repeating indicia on the backside surface of the media receives the beam of light; and a controller adapted to calculate an indicia repeat distance based on said first and second signals, and compare said calculated repeat distance to stored indicia repeat distances for reference media to determine the type of media.

10. An imaging apparatus according to claim 9, wherein said light source is an IR light source.

11. An imaging apparatus according to claim 9, wherein said indicia comprises a backside logo on the media.

12. An imaging apparatus according to claim 9, wherein said media is in the form of a web or cut sheets.

13. An imaging apparatus according to claim 9, wherein said media is photographic paper.

14. An imaging apparatus according to claim 9, wherein said sensor is a photo-sensor.

* * * * *